United States Patent
Wallmeier

(10) Patent No.: US 6,741,560 B1
(45) Date of Patent: May 25, 2004

(54) METHOD FOR ATM COMMUNICATION STATISTICAL MULTIPLEXING

(75) Inventor: Eugen Wallmeier, Eichenau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/485,437

(22) PCT Filed: Jul. 14, 1998

(86) PCT No.: PCT/DE98/01971

§ 371 (c)(1),
(2), (4) Date: Feb. 9, 2000

(87) PCT Pub. No.: WO99/09781

PCT Pub. Date: Feb. 25, 1999

(30) Foreign Application Priority Data

Aug. 13, 1997 (DE) .......................................... 197 35 169

(51) Int. Cl.[7] .................................................. H04J 3/16
(52) U.S. Cl. ........................ 370/230; 370/389; 370/468; 370/477
(58) Field of Search ................................ 370/229, 230, 370/231, 232, 233, 234, 389, 391, 395.1, 477, 412, 413, 414, 468

(56) References Cited

U.S. PATENT DOCUMENTS

| | | | | |
|---|---|---|---|---|
| 5,909,443 A | * | 6/1999 | Fichou et al. ................ | 370/412 |
| 5,917,804 A | * | 6/1999 | Shah et al. .................. | 370/230 |
| 5,949,758 A | * | 9/1999 | Kober ......................... | 370/232 |
| 6,046,981 A | * | 4/2000 | Ramamurth et al. ........ | 370/232 |
| 6,072,773 A | * | 6/2000 | Fichou et al. ............... | 370/230 |

FOREIGN PATENT DOCUMENTS

| | | |
|---|---|---|
| DE | 196 49 649 | 6/1998 |
| EP | 0 584 029 | 2/1994 |
| EP | 0 673 138 | 9/1995 |
| WO | WO 97/01895 | 1/1997 |

OTHER PUBLICATIONS

Eugen Wallmeier, "A Connection Acceptance Algorithm for ATM Networks Based On Mean and Peak Bit Rates", International Journal of Digital and Analog Communications Systems, vol. 3, (1990), pp. 143–153.

* cited by examiner

Primary Examiner—Alpus H. Hsu
Assistant Examiner—Roberta Stevens
(74) Attorney, Agent, or Firm—Morrison & Foerster LLP

(57) ABSTRACT

In ATM connections, a number of connections are usually transmitted over common connecting segments. Potentially newly added connections are allowed based on the measure of decisions made by acceptance algorithms. Knowledge of the momentarily reserved bandwidth is estimated step-by-step with the setup or release of connections.

4 Claims, 1 Drawing Sheet

METHOD FOR ATM COMMUNICATION STATISTICAL MULTIPLEXING

BACKGROUND OF THE INVENTION

The invention is directed to a method for transmission of information via an asynchronous transfer mode (ATM) and, more particularly, to a method for statistically multipexing ATM connections.

A number of connection types are defined for connections via which information is transmitted according to an asynchronous transfer mode (ATM). Connections having strict demands made on the cell delay times are distinguished from connections that do not make strict demands on the cell delay times.

In particular, connections transmitting information with a constant bit rate (CBR) as well as connections transmitting realtime information with variable bit rate (rt-VBR) are included among connections requiring strict cell delay times.

Non-real time VBR connections (rt-VBR) or connections transmitting information with a variable bit rate (available bit rate, ABR) or unspecified bit rate connections (UBR) are included among connections that do not have strict cell delay times.

The information of all five connection types is conducted in ATM cells in common over virtual paths or virtual lines having a predetermined bit rate (bandwidth). In the framework of setting up new connections that make strict demands for cell delay times, it is necessary to calculate the bandwidth that is required for the totality of all connections conducted over a connecting section/connecting line or a virtual path. The calculation of this effective bandwidth is required in order to determine what bandwidth is still free on the common connecting line and what bandwidth is available for the other connection types (nrt-VBR, ABR, UBR). Upon calculation of this effective bandwidth, a determination is then made as to the rate with which the large cell memory offered for the other connection types is allowed to be emptied.

When setting up an ATM connection, the transmitting means must generally inform a higher-ranking control means (call acceptance control) of previously defined parameters. This is required in order to assure the quality of the connection for all subscribers (quality of service). When, for example, too many cells are transmitted and, thus, the transmission capacity is exceeded, too many cells must be discarded. This, however, must be avoided under all circumstances since this always involves a loss of information. The requirement for a cell loss probability of $10^{-10}$ of a connection exists, for example, to achieve this purpose by standardization entities. For this reason, a calculation is already carried out at the connection setup as to whether this new connection can be accepted in addition to already existing connections. When the transmission capacity has already been exhausted, the requested connection is rejected.

A number of transmission parameters are defined for describing these events. These include, for example, the peak cell rate (PCR) defined on a connection. The peak cell rate is an upper limit for the number of ATM cells that can be transmitted per second via this connection. Further transmitting means informs the control means of a sustainable cell rate (SCR) given a connection with variable bit rate. This is the upper limit of an average cell rate with which the cells are transmitted during the existence of the connection. As further parameters, the maximum possible transmission capacity of the connecting line (link cell rate, C) as well as the maximum possible load on the connecting line ($p_0$) are known to the control means. The former is a matter of a quasi-material constant of the connecting line, whereas the latter defines a quantity of the maximum permitted sum cell rate on the connecting line. This is usually 95% of the maximum possible transmission capacity of the connecting line. Based on the measure of these parameters, a decision is then made as to whether new connection requests can be accepted or not.

A number of methods have been developed in the prior art for handling these events. An example of a simple method is the sigma rule algorithm disclosed in detail in German Patent Application DP 19649646.7. The sigma rule algorithm makes a decision at the beginning of a connection setup regarding which of two classes the potentially newly added ATM connection is to be assigned to, namely a class S and a class P. The class S has all virtual connections allocated to it for which a statistical multiplexing according to the sigma rule algorithm would yield a clear gain. These are usually low bit rate connections. The following condition must be met as criterion for these types of connections for the peak cell rate PCR and the sustainable cell rate SCR of all connections to be statistically multiplexed:

$(PCR/C<0.03)$ and $(0.1 \leq SCR/PCR \leq 0.5)$

All other virtual connections are allocated to the class P. These particularly include connections having constant bit rate. Further, all the connections for which the parameters SCR as well as PCR lie very close to one another or lie very far apart or connections that already exhibit a high peak cell rate PCR are allocated here. A peak cell rate that is greater than 3% of the maximum possible transmission capacity of the connecting line is a valid criterion for this.

The first class S in this prior art is then divided into further sub-classes $S_1$, $S_2$ or $S_3$ in order to achieve an even finer classification. The sigma rule algorithm must, when a new connection request arrives, check which of the sub-classes this new connection is to be assigned to based on the measure of defined interrogation criteria The most favorable sub-class $S_x$ is then automatically selected. A sub-class $S_x$ is thereby defined via a lower limit or, an upper limit of the peak cell rate PCR as well as of the ratio of the transmission parameters SCR/PCR.

This connection acceptance algorithm according to the prior art is, thus, in the position of deciding whether a prescribed bandwidth, (e,g., the bandwidth of a virtual path or a line) is adequate overall for a group of real time connections or constant bit rate connections. Since such acceptance algorithms supply a yes/no decision as a result of determining whether a connection is to be accepted or not, they are not directly suited for calculating the effective bandwidth for a group of connections.

Fundamentally, the effective bandwidth required for a group of real time connections and constant bit rate connections according to the sigma rule acceptance algorithm could be determined with arbitrary precision on the basis of an iterative approximation method. The problem of this method, however, is that the acceptance algorithm would have to be run repeatedly per connection setup and would thus use far too much processor capacity.

SUMMARY OF THE INVENTION

The present invention is based on the feature disclosing a way of how an acceptance algorithm is to be fashioned such that a representative bandwidth for all connections can be calculated in an efficient way.

According to an embodiment of the present invention, a method is provided for statistically multiplexing a plurality of ATM connections. The plurality of connections are conducted via a common connecting line having an overall effective bandwidth reserved for conducting the plurality of ATM connections. The common connecting line also utilizes an acceptance algorithm that decides, based on acceptance criteria and a prescribed bandwidth, whether potential additional connections can be accepted on the common connecting line. In particular, the method includes the steps of first setting the overall effective bandwidth equal to an initial value. Next, the overall effective bandwidth is then determined on a step-by-step basis upon occurrence of at least one of a setup of a connection and a release of a connection. The acceptance algorithm is then started during every step and the overall effective bandwidth is modified by at least one of a first traffic parameter and a second traffic parameter based on at least one of the acceptance criteria.

Particularly advantageous for the invention is that the effective bit rate, proceeding from an initial value, is determined step-by-step with the setup/release of connections in that the acceptance algorithm is started at every step and the effective bandwidth is modified by a first or a second traffic parameter according to the measure of an acceptance criterion. The effective band width is thus estimated rather exactly by the yes/no decision of the acceptance algorithm.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawing wherein.

DETAILED DESCRIPTION OF THE PREFERRED EMBODIMENTS

Figure 1:
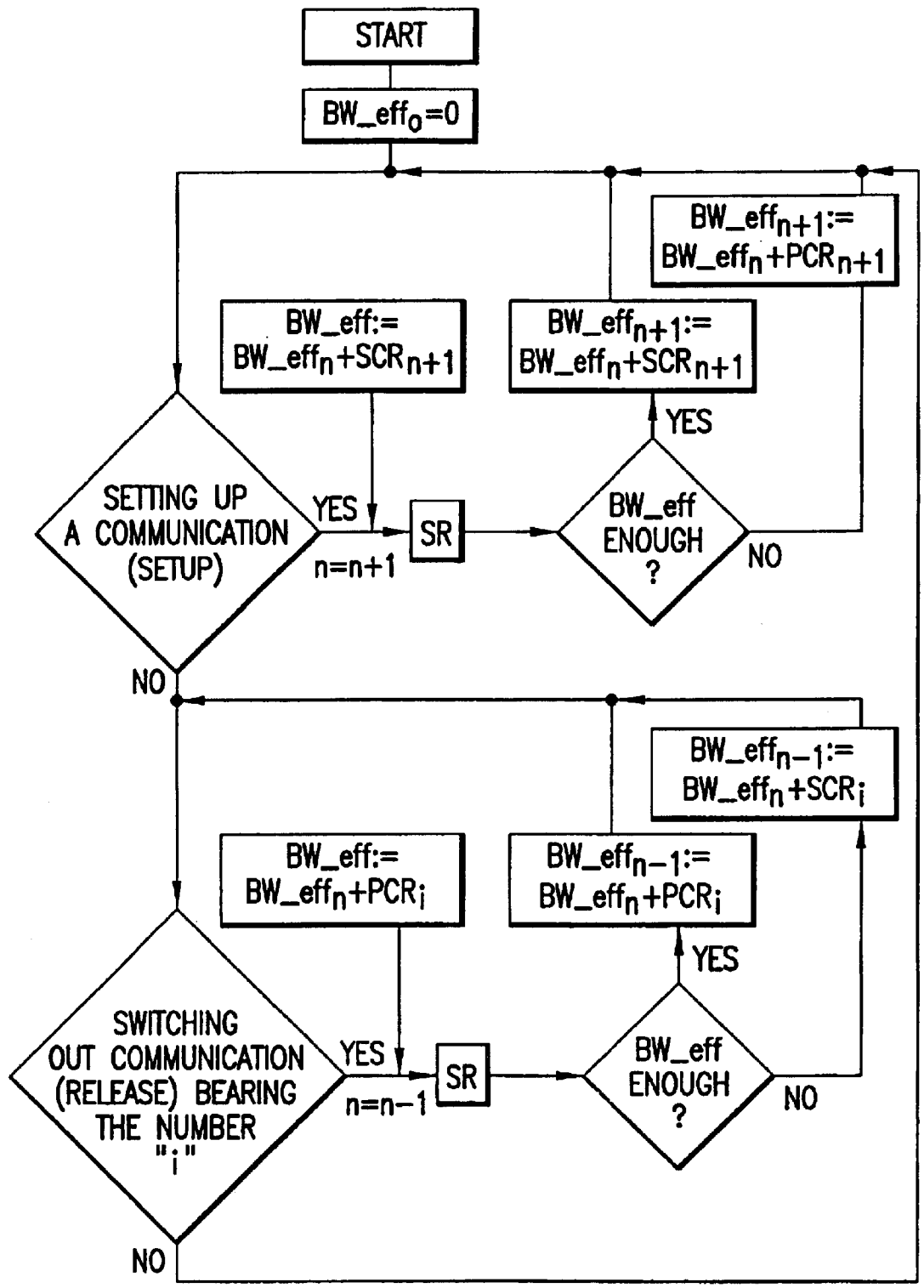
FIG. 1, shows a flow chart according to the present inventive method.

The bit rate of a group of connect os of the real me type (RT-VBR) and constant bit rate connections of the CBR type could be fundamentally calculated by summing the effective bit rates BW_eff of the individual connections. This linear approach, however, does not take into consideration that the bit rate required for a connection is not only dependent on the connection itself but is also dependent on the traffic parameters of other connections with which a connection being considered shares the capacity of a connecting line. When, for example, only connections of the CBR type are previously present on a connecting line, then the effective bit rate BW_eff that an additional real time connection rt-VBR requires corresponds to its peak cell rate PCR. When, by contrast, the real time connection is accepted in addition to the existing real time connections, then the additionally required capacity (effective bit rate of the connection) will be lower in many instances.

The invention takes into consideration that the transmission capacity BW_eff required for a group of connections cannot, in particular, be determined by summing up bit rate values of the individual connections.

It is assumed for the present exemplary embodiment that the known sigma rule algorithm is employed as acceptance algorithm SR. No modifications whatsoever are undertaken regarding the sigma rule algorithm itself. The sigma rule algorithm SR is started on the basis of a predetermined, effective bandwidth BW_eff and supplies a decision as to whether or not the bandwidth is adequate for a predetermined plurality of connections. Subsequently, this effective bandwidth BW_eff is incremented or decremented by traffic parameters based on the criterion of the result determined by the signal rule algorithm SR. These traffic parameters are a matter of the peak cell rate PCR and the sustainable cell rate SCR.

The present invention features estimating the effective bit rate BE_eff of a group of connections in step with the setup and release of connections. The sigma rule algorithm SR is thereby called exactly once per connection setup and on the basis of the predetermined bandwidth—(e,g., the bit rate of a virtual path or of a connecting line, supplies a yes/no decision as to whether or not this bandwidth is adequate overall for a group of connections to be added.

A flow chart of the present method is shown in FIG. 1.

According to the present exemplary embodiment, it is assumed that a plurality of n-connections of potentially different types already exist on the common connecting line and a new connection n+1 is now to be added.

In accordance therewith, the sigma rule algorithm SR, which was initialized with an effective bandwidth BW_eff=0, is started on the basis of the current effective bandwidth BW_eff at the moment for this connection to be accepted. This is the effective bandwidth BW_eff$_n$ (of the n existing connections) plus the sustainable cell rate SCR$_{n+1}$ (for the n+1 connection to be added) as defined by the following relationship, $$BW\_eff := BW\_eff_n + SCR_{n+1}.$$

When the sigma rule algorithm SR determines that the bandwidth of the existing n connections including the potentially newly added connection (n+1) is adequate, the effective bandwidth BW_eff$_n$ is replaced by the previous effective bandwidth BW_eff$_n$ plus the sustainable cell rate SCR$_{n+1}$ for this newly added connection.

When the signal rule algorithm SR determines that the bandwidth of the existing n connections, including the potentially newly added connection (n+1), is not adequate, the effective bandwidth BW_eff$_n$ is replaced by the previous effective bandwidth BW_eff$_n$ plus the peak cell rate PCR$_{n+1}$ for this newly added connection.

The new values of the effective bandwidth determined in this way are then taken as the basis for setup/released further connections to be setup or released.

Similarly, the process for the release of connections from the connecting line proceeds similar to the above procedure for setting up additional connections.

In accordance with the release of connection process; and after the release of a connection, the sigma rule algorithms SR is started on the basis of the current effective bandwidth BW_eff current at of the moment. This is the effective bandwidth BW_eff$_n$ the n existing connections minus thee peak cell rate PCR$_i$ (for the released $i^{th}$ connection) as defined by the following relationship, $$BW\_eff = BW\_eff_n - PCR_i.$$

When the sigma rule algorithm SR determines that the effective bandwidth for the remaining connections is now adequate (i.e. after the release of the $i^{th}$ connection,) the effective bandwidth BW_eff$_{n-1}$ is replaced by the previous effective bandwidth $BW\_eff_n$ minus the peak cell rate $PCR_i$ for this released connection.

When the sigma rule algorithm SR determines that the effective bandwidth for the remaining connections is inadequate, (i.e. after the release of the $i^{th}$ connection,) the effective bandwidth $BW\_eff_{n-1}$ is replaced by the previous effective bandwidth $BW\_eff_n$ minus the sustainable cell rate $SCR_i$ for this released connection.

The new values of the effective bandwidth determined in this way are then taken as basis for further connections to be setup or released.

An estimated value is thus determined with the inventive method. This deviates from the exact bit rate $BW\_eff$ defined by the sigma rule algorithm by less than the maximum (PCR−SCR). The maximum is thereby formed over all connections on the connecting line. What the present method utilizes is that the transmission bit rate that is required on a line or on a virtual path for a connection lies between the peak cell rate PCR at the sustainable cell rate SCR. Connections of the types CBR and VBR are handled in that PCR=SCR is set.

While this invention has been described in connection with what is presently considered to be the most practical and preferred embodiment, it is to be understood that the invention is not limited to a disclosed embodiment, but, on the contrary, is intended to cover various modifications and equivalent arrangements included within the spirit and scope of the appended claims.

What is claimed is:

1. A method for statistically multiplexing a plurality of ATM connections, the plurality of ATM connections being conducted via a common connecting line having an overall effective bandwidth reserved for conducting the plurality of ATM connections and utilizing an acceptance algorithm that decides, based on acceptance criteria and a prescribed bandwidth, whether potential additional connections can be accepted on the common connecting line, comprising:

setting the overall effective bandwidth equal to an initial value;

determining the overall effective bandwidth on a step-by-step basis with occurrence of at least one of a setup of a connection and a release of a connection;

starting the acceptance algorithm during every step; and modifying the overall effective bandwidth by at least one of a first traffic parameter and a second traffic parameter based on at least one of the acceptance criteria, wherein the at least one of the acceptance criteria for the setup of a connection is configured such that when the overall effective bandwidth with a potential additional connection is adequate, the overall effective bandwidth is increased by the amount of the first traffic parameter and the result is set as a new overall effective bandwidth; and when the overall effective bandwidth with a potential additional connection is not adequate, the overall effective bandwidth is increased by the amount of the second traffic parameter and the result is set as the new overall effective bandwidth.

2. The method according to claim 1, wherein the at least one of the acceptance criteria for the release of a connection is configured such that when the overall effective bandwidth with the released connection is adequate, the overall effective bandwidth is decreased by the amount of the second traffic parameter and the result is set as the new overall effective bandwidth; and when the overall effective bandwidth with the released connection is not adequate, the overall effective bandwidth is decreased by amount of the first traffic parameter and the result is set as the new overall effective bandwidth.

3. The method according to claim 1, wherein the first traffic parameter is a sustainable cell rate and the second traffic parameter is a peak cell rate.

4. The method according to claim 1, wherein the acceptance algorithm is started only once for each potential additional connection.

* * * * *